United States Patent
Sundberg et al.

(10) Patent No.: US 10,694,497 B2
(45) Date of Patent: Jun. 23, 2020

(54) METHOD AND APPARATUS FOR SENSING

(71) Applicant: Telefonaktiebolaget LM Ericsson (publ), Stockholm (SE)

(72) Inventors: Mårten Sundberg, Årsta (SE); Ricardo Blasco Serrano, Stockholm (SE); Hieu Do, Järfälla (SE); Stefano Sorrentino, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 314 days.

(21) Appl. No.: 15/735,645

(22) PCT Filed: Sep. 29, 2017

(86) PCT No.: PCT/SE2017/050962
§ 371 (c)(1),
(2) Date: Dec. 12, 2017

(87) PCT Pub. No.: WO2018/063085
PCT Pub. Date: Apr. 5, 2018

(65) Prior Publication Data
US 2020/0068531 A1 Feb. 27, 2020

Related U.S. Application Data

(60) Provisional application No. 62/402,186, filed on Sep. 30, 2016.

(51) Int. Cl.
*H04W 72/02* (2009.01)
*H04W 4/40* (2018.01)
(Continued)

(52) U.S. Cl.
CPC ........... *H04W 72/02* (2013.01); *H04L 5/0082* (2013.01); *H04W 4/40* (2018.02);
(Continued)

(58) Field of Classification Search
None
See application file for complete search history.

(56) References Cited

U.S. PATENT DOCUMENTS

2016/0278003 A1 9/2016 Kim et al.
2016/0295624 A1* 10/2016 Novlan ................ H04W 76/14
(Continued)

FOREIGN PATENT DOCUMENTS

| EP | 3 182 767 A2 | 6/2017 |
| WO | WO 2015/133816 A1 | 9/2015 |
| WO | WO 2016/024821 A2 | 2/2016 |

OTHER PUBLICATIONS

"Discussion on P2x," 3GPP TSG RAN WG1 Meeting #86, Gothenberg, SE, Aug. 22-26, Aug. 2016 (R1-166965), 5 pages.
(Continued)

*Primary Examiner* — Michael J Moore, Jr.
(74) *Attorney, Agent, or Firm* — Sage Patent Group

(57) ABSTRACT

A method by a user equipment, UE, that includes acquiring information about an allowed time interval at which resources in a pool of resources can be reserved for future transmission by the UE, and sensing using the resources in the pool and at a first time interval determined based on the allowed time interval for the pool. UEs that perform operations corresponding to the method are disclosed.

25 Claims, 7 Drawing Sheets

(51) Int. Cl.
  *H04L 5/00* (2006.01)
  *H04W 52/02* (2009.01)
  *H04W 72/04* (2009.01)
  *H04W 74/08* (2009.01)
(52) U.S. Cl.
  CPC ... *H04W 52/0216* (2013.01); *H04W 52/0277* (2013.01); *H04W 72/0453* (2013.01); *H04W 74/0808* (2013.01)

(56) References Cited

U.S. PATENT DOCUMENTS

| | | | |
|---|---|---|---|
| 2017/0078863 A1 | 3/2017 | Kim et al. | |
| 2017/0332390 A1* | 11/2017 | Li | H04L 5/0094 |
| 2017/0366920 A1* | 12/2017 | Agiwal | H04W 4/70 |
| 2018/0020387 A1* | 1/2018 | Van Der Velde | H04W 36/0072 |
| 2018/0041863 A1* | 2/2018 | Taylor | G08G 1/005 |
| 2018/0049162 A1* | 2/2018 | Patil | H04L 67/12 |
| 2018/0146491 A1* | 5/2018 | Kim | H04W 24/10 |
| 2018/0249444 A1* | 8/2018 | Sorrentino | H04W 72/02 |
| 2018/0279094 A1* | 9/2018 | Blasco Serrano | H04W 72/04 |
| 2019/0059091 A1* | 2/2019 | Tang | H04W 74/0808 |
| 2019/0082421 A1* | 3/2019 | Sartori | H04W 72/02 |
| 2019/0182840 A1* | 6/2019 | Feng | H04W 72/06 |
| 2019/0191442 A1* | 6/2019 | Lu | H04W 72/02 |
| 2019/0191461 A1* | 6/2019 | Lee | H04W 72/1263 |
| 2019/0246385 A1* | 8/2019 | Lin | H04L 5/0007 |
| 2019/0313375 A1* | 10/2019 | Loehr | H04W 72/04 |
| 2019/0313405 A1* | 10/2019 | Li | H04W 24/08 |
| 2020/0037358 A1* | 1/2020 | Chae | H04W 74/0808 |

OTHER PUBLICATIONS

"Revised WI Proposal: LTE-based V2x Services," 3GPP TSG RAN Meeting #73, New Orleans, LA, US, Sep. 19-22m, 2017 (RP-161894), 10 pages.

"Study on LTE Device to Device Proximity Services, Radio Aspects (Release 12)" 3GPP Technical Specification Group Radio Access Network (3GPP TR 36.843 V12.0.1 (Mar. 2014) 50 pages.

"Study on LTE-based V2X Services (Release 14)" 3GPP Technical Specification Group Radio Access Network (3GPP TR 36.885 V14.0.0 (Jun. 2016) 216 pages.

Notification of Transmittal of the International Search Report and the Written Opinion of the International Searching Authority, or the Declaration for PCT International Application No. PCT/SE2017/050962, 18 pages (dated Jan. 3, 2018).

* cited by examiner

METHOD AND APPARATUS FOR SENSING

CROSS REFERENCE TO RELATED APPLICATIONS

This application is a 35 U.S.C. § 371 national stage application of PCT International Application No. PCT/SE2017/050962 filed on Sep. 29, 2017, which in turns claims domestic priority to U.S. Provisional Patent Application No. 62/402,186, filed on Sep. 30, 2016, the disclosures and content of which are incorporated by reference herein in their entirety.

TECHNICAL FIELD

The present disclosure relates to methods and operations by user equipments for resource management and distributed resource allocation, such as in D2D or more particularly V2X communications.

BACKGROUND

During Release 12, the LTE standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

D2D communications may be extended to support Vehicle-to-X (V2X) communications, which includes any combination of direct communication between vehicles, pedestrian carried devices, and infrastructure mounted devices. V2x communication may take advantage of available network (NW) infrastructure, although at least basic V2x connectivity can be possible in case of lack of available network infrastructure. Providing an LTE-based V2x interface may be economically advantageous because of the LTE economies of scale and it may enable tighter integration between communications with the NW infrastructure (vehicle-to-infrastructure (V2I)), vehicle-to-pedestrian (V2P), and vehicle-to-vehicle (V2V) communications, as compared to using a dedicated V2x technology.

V2x communications may carry both non-safety and safety information, where each of the applications and services may be associated with specific requirements sets, e.g., in terms of latency, reliability, capacity, etc.

The European Telecommunications Standards Institute (ETSI) has defined two types of messages for road safety: Co-operative Awareness Message (CAM) and Decentralized Environmental Notification Message (DENM).

A CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. Devices check availability of a CAM message every 100 ms, yielding a maximum detection latency requirement is not more than 100 ms for most CAM messages. However, the latency requirement for Pre-crash sensing warning is not more than 50 ms.

A DENM message is event-triggered, such as by braking, and the availability of a DENM message is also checked for every 100 ms, and the requirement of maximum latency is not more than 100 ms.

The package size of CAM and DENM message can vary from more than 100 to more than 800 bytes, although the typical size is around 300 bytes depending on the specific V2X use case, message type (e.g. DENM can be larger than CAM), and depending on the security format included in the packet (e.g., full certificate or certificate digest). The message is supposed to be detected by all vehicles in proximity.

The Society of the Automotive Engineers (SAE) has defined a Basic Safety Message (BSM) for DSRC with various defined messages sizes. Based on the importance and urgency of the messages, the BSMs are further classified into different priorities.

Sensing-Based Resource Allocation with Booking

In V2x communications, two major types of traffic are distinguished: recurrent traffic and event-triggered traffic. Various embodiments disclosed herein are mostly related to recurrent traffic, where the transmitted packets arrive regularly (e.g., they may be strictly periodic or have some deviation from an average periodicity).

One efficient way to schedule recurrent-traffic V2x transmissions is to use radio resource booking. In resource allocation using resource booking a user equipment (UE) can book radio resources in advance for transmitting the next packet (including all the retransmissions). The minimum time span of a booking is usually taken to be the minimum time between two consecutive packets (e.g., the minimum message periodicity). Similarly, the maximum time span of a booking is usually taken to be the maximum time between two consecutive packets (e.g., the maximum message periodicity). For example, in V2X the time interval between the generation of two consecutive CAM messages may not be shorter than 100 ms (in the absence of congestion control) and may not exceed 1 s. Thus, it is reasonable to allow bookings for 100 ms, 200 ms, . . . , or 1 s, as it is currently being considered by 3GPP. Usually, the UE signals the booking information to other UEs. This allows a receiving UE to predict the future utilization of the radio resources by reading received booking messages and schedule its current transmission to avoid using the same resources. To do so, a UE needs to sense the channel for some time duration preceding the (re)selection trigger to gather booking messages. In addition, it may also be possible to transmit unhooking messages that release previously booked resources. For accurate prediction, the sensing time should be long enough to detect booking and/or unbooking messages from other relevant UEs.

FIG. 1 illustrates an example of the sensing-based resource selection mechanism with booking. Let T be the minimum time between two recurrent transmissions by a UE, which we refer to as "basic period". That is, a UE with recurrent traffic transmits, at most, one packet every T seconds (a transmission may consist of several retransmissions, although this is not illustrated in FIG. 1 for simplicity). In FIG. 1, UE 1 transmits a packet at time to and meanwhile books—e.g., transmits a booking message to other UEs indicating—its intention to transmit the next packet at ta+4T. Similarly, UE 2 transmits a packet at time tb and meanwhile books—e.g., transmits a booking message to other UEs indicating—its intention to transmit the next packet at tb+2T. At time tc, UE 3 wants to select or reselect a radio resource for its transmission within the time window [tc,tc+T]. UE 3 has been monitoring the channel during a time window of size 4T. UE 3 uses its channel observations in this window to predict the future utilization of the radio resources and accordingly select a radio resource for its transmission (e.g., a resource that is not indicated by the above bookings to avoid potential collision).

It is clear that to achieve good performance the sensing window must be long enough to include as many bookings as possible or necessary. Commonly, the size of the sensing window is sufficiently large to roughly cover the longest possible booking (in terms of basic periods). In the example in FIG. 1, the sensing window is chosen to consist of four basic periods ("T" in FIG. 1). In the remainder of this disclosure, the expressions "sensing over the entire window" and "sensing over the whole window" refer to performing the sensing operation using the largest possible window size (i.e., the largest window size that the system allows for).

It is noted that in this example and in the rest of this disclosure, UEs may or may not operate using a common division of the time in terms of basic periods. That is, time may be divided into "basic periods" in the same way for all UEs or, alternatively, different UEs may have different divisions of time into "basic periods".

Sidelink Operations

Sidelink transmissions (also known as D2D or ProSe) over the so-called PC5 interface in cellular spectrum have been standardized in 3GPP since Rel-12. In 3GPP Rel-12 two different operative modes (sometimes referred to as transmission modes) have been specified in 3GPP. In one mode (mode-1), a UE in RRC_CONNECTED mode requests D2D resources and the eNB grants them via PDCCH (DCIS) or via dedicated signalling. In another mode (mode-2), a UE autonomously selects resources for transmission from a pool of available resources that the eNB provides in broadcast via SIB signalling for transmissions on carriers other than the PCell or via dedicated signaling for transmission on the PCell. Therefore, unlike the first operation mode, the second operation mode can be performed also by UEs in RRC_IDLE.

In 3GPP Rel.14, the usage of sidelink is extended to the V2x domain. The design of the sidelink physical layer in Rel.12 has been dictated by the assumptions of few amount of UEs competing for the same physical resources in the spectrum, to carry voice packet for MCPTT traffic, and low-mobility. On the other hand, in V2x the sidelink should be able to cope with higher load scenario (i.e. hundreds of cars could potentially contend physical resources), to carry time/event triggered V2x messages (CAM, DNEM), and high mobility. For such reasons, 3GPP has discussed possible enhancements to the sidelink physical layer.

An enhancement of the physical layer has been proposed for the UE to perform resource selection on mode-2 to enhance the UE autonomously selecting resources for transmission. Before 3GPP Rel-14, the UE performs resource selection randomly, i.e. the eNB provides a pool of time/frequency resources and the UE randomly pick a subset of resources from such pool to perform sidelink transmission. With the introduction of V2V in 3GPP Rel.14, the UE performs sensing before transmitting. Unlike random selection, with sensing the UE monitors the sidelink resources for a certain amount of time, for example, 1 second, before performing transmission. In this way, the risk of transmission collisions with other UEs in the surrounding area may be significantly reduced compared with random selection since the UE selects the resources that according to the sensing procedure are supposed to be less interfered.

The sensing procedure implies that a UE can book transmitting resources for future transmissions. The booked resources are announced to surrounding UEs in the sidelink control channel Upon receiving such sidelink control channel information surrounding UEs may estimate the interference for a future resource allocation, and on this basis, may determine whether to transmit or not in such corresponding resource allocation. Multiple booking processes may be performed by the UE.

In 3GPP Rel.14, two new modes (sometimes referred to as transmission modes) were introduced for LTE sidelink: mode-3 and mode-4. Mode-3 is an extended version of mode-1 targeting V2x communications. In mode-3, resource allocation is performed by the eNB. Mode-4 is an autonomous mode in which the UE selects its own resources for transmission. Selection in mode-4 is based on the sensing and makes use of resource reservation, as described above. Although mode-4 UEs select resources autonomously, the eNB may retain some degree of control over them. For example, it may configure a specific set of resources to be used by mode-4 UEs; or it may prevent mode-4 UEs from accessing certain resource.

Problems with Existing Solutions

Communication between vehicular UEs (V-UEs) and pedestrian UEs (P-UEs) is commonly referred to as V2P. One important aspect of the V2P communication is that energy efficiency is of outmost importance for the pedestrian UEs. That is, if an end-user smart phone starts to consume significantly more energy when V2P is turned on, it is reasonable to believe that many end-users will actively turn off the V2P/P2V. In this case the security situation will not be improved compared to today's situation since the vehicle (or the pedestrian) will not be informed about a potential danger.

To understand the energy consumed in different scenarios, an energy model has been agreed upon in 3GPP, see Hi, which can include the assumed parameters below:

$T_{sync}$=8 subframes
$T_{paging}$=$T_{Tx}$=1 subframe
$T_{sensing}$=variable number of subframes
$P_{sleep}$=0.01 units
$P_{Rx}$=1 unit
$P_{GPS}$=0.08 units
$P_{Tx}$=4 units (23 dBm output power)

As shown above, the modeled parameters include synchronization, paging monitoring, frames where the UE turns off many of its active components (referred to as being in 'sleep'), transmission of a message, and GPS reception.

For simplicity, it is assumed in the calculations shown below in Table 1, that energy consumption due to the UE being in sleep applies to each subframe (it should for example not apply when the UE is actively transmitting or receiving, but since it has very little impact to the overall energy consumption, and since it is simplifying the calculations, this assumption is taken).

TABLE 1

Energy consumptions for different cases

| Case | Energy units | Detailed calculations |
|---|---|---|
| Reference UE (see also [2]) | 0.017 | $P_{Sleep} + \frac{(T_{sync} + T_{paging})P_{Rx}}{1280}$ |

TABLE 1-continued

Energy consumptions for different cases

| Case | Energy units | Detailed calculations |
|---|---|---|
| P-UE with active GPS | 0.103 | $P_{Sleep} + \dfrac{T_{paging}P_{Rx}}{1280} + \dfrac{(T_{sync}P_{Rx} + T_{Tx}P_{Tx})}{1000} + P_{GPS}$ |
| P-UE with active GPS and sensing during 10 subframes over 1 s | 0.113 | (**) |
| P-UE with active GPS and sensing during 50 subframes over 1 s | 0.153 | |

$$(**)P_{Sleep} + \dfrac{T_{paging}P_{Rx}}{1280} + \dfrac{((T_{sync} + T_{sensing})P_{Rx} + T_{Tx}P_{Tx})}{1000} + P_{GPS}$$

Without needing to examine the detailed calculations, it can clearly be seen that a P-UE that is required to keep its GPS activity on continuously, greatly exceeds the reference UE energy consumption (0.017 vs 0.103, i.e. a 500% increase). Furthermore, if sensing is added to the P-UE activity even higher energy consumption is observed, with roughly a 50% increase (0.153 vs 0.103) when sensing 50 subframes during 1 second.

Assuming that the GPS energy consumption can be made more power efficient, and that $P_{IPS}$ can be reduced from 0.08 to 0.02 (for example one could realize this by having the GPS receiver turned on less frequently), the relative increase from the reference UE to the P-UE without sensing is then reduced to from 500% to 211%, but instead the relative energy consumption between different sensing periods is increased. Comparing a sensing of 50 subframes instead of 10 subframes now increases by 75% instead of earlier 35% (0.153 vs 0.113).

Thus, it is important to minimize the sensing of a V2P P-UE in order to keep energy consumption low.

One of the sensing solutions proposed for V2P (still under discussion in 3GPP, see [3]), mandates the P-UE to monitor each subframe where resources can be reserved for the subframe where transmission is intended. For example, if transmission is intended in subframe N, and reservations can be done in periods of 100 ms reserving resources at most 1 second in advance, then the P-UE needs to sense the resource in subframes at N-100k, where k=1, 2, . . . , 9, 10.

With a shorter resource reservation period (being discussed in 3GPP, see [4]), the number of subframes that a P-UE need to monitor is increased, and by this, the energy consumption is increased.

The approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

One embodiment is directed to a method by a user equipment (UE) that includes acquiring information about an allowed time interval at which resources in a pool of resources can be reserved for future transmission by the UE, and sensing using the resources in the pool and at a first time interval determined based on the allowed time interval for the pool.

A benefit of these operational steps is that the UE's energy efficiency when sensing can be increased by restricting the sensing to the selected resources and to the determined time interval. Different resource pools can be assigned to different UEs depending on the resource reservation period allowed in each pool, so that shorter resource reservation periods can be more effectively used when sensing. Increasing the UE's energy efficiency results in conservation of critical battery reserves and can facilitate greater technology incorporation of V2P into UEs and greater operational availability of V2P communications.

Another related embodiment is directed to a UE that includes at least one radio transceiver circuit, at least one processor circuit, and at least one memory circuit. The at least one processor circuit is coupled to the at least one radio transceiver circuit. The at least one memory circuit is coupled to the at least one processor circuit, and stores program code that when executed by the at least one processor circuit causes the at least one processor circuit to perform operations. The operations include acquiring information about an allowed time interval at which resources in a pool of resources can be reserved for future transmission by the UE, and sensing using the resources in the pool and at a first time interval determined based on the allowed time interval for the pool.

Another related embodiment is directed to a UE that includes an acquiring module for acquiring information about an allowed time interval at which resources in a pool of resources can be reserved for future transmission by the UE, and a sensing module for sensing using the resources in the pool and at a first time interval determined based on the allowed time interval for the pool.

Another related embodiment is directed to a UE that is configured to acquire information about an allowed time interval at which resources in a pool of resources can be reserved for future transmission by the UE, and to sense using the resources in the pool and at a first time interval determined based on the allowed time interval for the pool.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Various embodiments of the present disclosure are directed to operations and methods by UEs and network nodes for generating or acquiring resource pools or resource pool configurations. The resource pools may be configured by the network depending on the transmission mode used in the network. For example, a network can separate the resources in time and/or frequency between the cases:

UEs autonomously selects resources to transmit on the sidelink (Mode 2 is in D2D-Prose and Mode 4 in V2X);

Network controls scheduling of resources (Mode 1 is in D2D-Prose and Mode 3 in V2X).

In the present disclosure, this is also referred to as configuration of resource pools.

Figure 2:
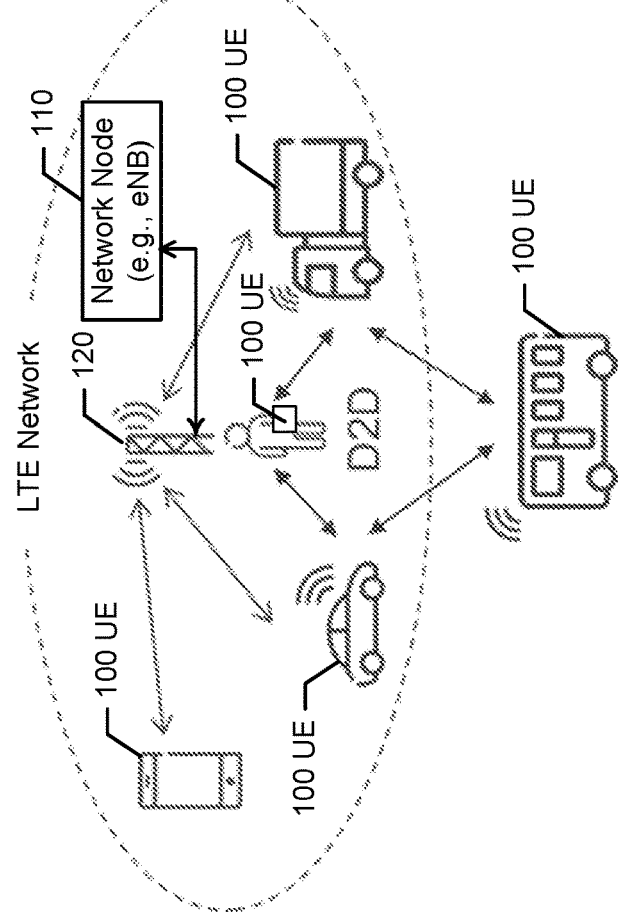
FIG. 2 illustrates a block diagram of a communication system that includes UEs configured for V2x communication in accordance with various embodiments of the present disclosure.

Various embodiments of the present disclosure are described without limitation in the context of a communication system shown in the block diagram of FIG. 2. The communication system includes UEs that are configured for D2D, V2x, and/or other communication in accordance with various embodiments of the present disclosure. The communication system can include a radio node 120, a network node 110 (e.g., an eNB), and a plurality of UEs 100. The UEs 100 can be any type of electronic device configured for D2D and/or V2x communications such as any one or more of: vehicle-to-infrastructure (V2I) communications; vehicle-to-pedestrian (V2P) communications; and vehicle-to-vehicle (V2V) communications. As used herein, D2D is referred to in a broader sense to include communications between any type of UEs, and includes V2x communications between a vehicle and any other type of UE. Example types of a UE 100 include, but not limited to, a personal data assistant (PDA), tablet computer (e.g., iPAD), mobile terminal, smart phone, smart watch, laptop embedded equipped (LEE), laptop mounted equipment (LME), vehicle mounted communication device, infrastructure mounted communication device, etc.

Although various embodiments are explained in the context of V2x communications, these embodiments can also be used for x2V communications. Accordingly, each use of the term "V2x" herein can be replaced with the term "x2V" for disclosure all of those corresponding embodiments. Similarly, these embodiments can be used for other types of device to device communications, including D2D. Accordingly, each use of the term "V2x" herein can be replaced with the term "D2D" for the disclosure all of those corresponding embodiments.

Various embodiments are directed to overcoming one or more of the abovementioned problems of increased energy consumption from the use of a shorter resource reservation period, by assigning different resource pools to different UEs depending on the resource reservation period allowed in each pool. In one embodiment, the different resource pools can be separate resources in time and frequency, while in other embodiments the resource pools can be partly or fully overlapping. In other embodiments, a set of resource reservation periods can be considered for one and the same pool of resources, while in other resource pools only a single resource reservation period is configured.

Figure 3:
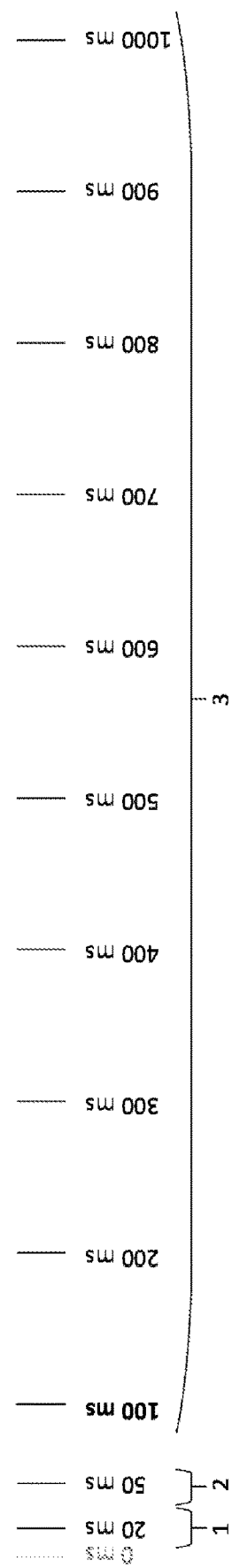
FIG. 3 is a graph that illustrates illustrating three different resource pools configured according to some embodiments.

In one example, the resource reservation periods illustrated in FIG. 3 for V2X services may be assumed. FIG. 3 is a graph illustrating three different resource pools 1, 2, 3, where each pool defines resources that can be reserved for transmission by a UE, and where each pool has an allowed time interval at which resources can be reserved for transmission by the UE. The allowed time interval thus corresponds to the resource reservation period of a pool. A common period that may be expected in the network for periodic resource reservation is 100 ms (indicated by bold text in the FIG. 3). In accordance with one embodiment, a resource pool 3 is defined that includes 100 ms as the lowest allowed time interval. The lowest allowed time interval will control the energy consumption of the UEs sensing the resources. Since longer periods will not impact the energy consumption it is also possible that periodic time intervals of 200 ms, 300 ms, . . . , or 1000 ms periods (or other multiples of 100 ms) are included in the same resource pool 3. However, including also the 50 ms resource reservation period in resource pool 3 would increase energy consumption by the UEs, possibly by a factor of two, and for the 20 ms resource reservation period would increase energy consumption of the UEs by a factor of five. These are substantial increases in energy consumption which would impact all UEs sensing the resources according to that pool, even if there is only one UE making use of these shorter periodic scheduling intervals or resource reservation periods. Hence, in this example, three resource pools are configured to ensure energy efficient sensing operation of the UEs using the information defined for those pools.

Potential benefits of the operations and methods of these embodiments are highlighted by the following explanation. Expanding on the energy consumption calculations above, the smallest energy consumption in case of 100 ms allowed time interval (e.g., resource pool 3) is monitoring of 10 subframes (100 ms periods over 1 second), which results in an energy consumption per subframe of E3=0.113. The corresponding energy consumption for resource pool 1 and 2 would be E1=0.153 and E2=0.123 respectively. Comparing this to only having a single resource pool, which would have to be dimensioned for the lowest resource reservation period, the energy consumption would always be 0.153 (E1), which would mean a 35% increase of the energy consumption for devices that are configured to operate in resource pool 3 (0.153/0.113), and a 24% increase of the energy consumption for devices that are configured to operate in resource pool 2 (0.153/0.123). The corresponding gain with a reduced GPS energy consumption as mentioned in Section 2.2 would be an increase of 76% and 48% in energy consumption if not using the invention respectively. The allowed time interval can define a resource reservation period of a pool.

The configuration of resource pools is, in one embodiment, done via RRC signaling. This could be seen as a semi-static configuration. In some alternative embodiments, signaling the functionality in a semi-static configuration could be done via System Information Blocks (SIBs). In another embodiment where a more dynamic configuration of resource pools is desired, the configuration could be provided by dedicated control signaling. In some embodiments, the minimum allowable booking periodicity, also referred to as the minimum allowed time interval or the resource reservation period, is signaled so that the devices can adapt their sensing protocol accordingly.

In some embodiments, a UE is configured with several pools with different minimum periodicities or allowed time intervals. The UE access one or another pool according to the requirements of its traffic. In other embodiments, the UE also takes energy considerations into account. For example, a UE with full battery may choose to monitor (and transmit) on any pool, including those with smallest minimum periodicity or allowed time interval. A UE with limited battery may choose to monitor (and transmit) only on pools with largest minimum periodicity or allowed time interval.

In some embodiments, the UE bases the sensing on some measurements. For example, if the channel is perceived as lightly loaded (i.e., few users are using it), then the UE senses using the largest minimum periodicity; whereas if the channel is perceived as highly loaded (i.e., many users are using it), then the UE senses using smaller minimum periodicities. In some embodiments, the UE bases the sensing of the received power of other and/or some estimate of the distance to other UEs.

In an additional embodiment the minimum supported periodicity or allowed time interval is not necessarily configured for a pool, or a UE could simply be unaware of such configuration for any reason. In this case, the UE detects transmissions by other UEs as part of its sensing procedure and it detects the booking periodicity used for such transmissions. Depending on the detected booking periodicities the UE adjusts its sensing window. E.g., if no booking periodicities are detected below 100 ms, the UE may sense the radio channel with a periodicity of 100 ms, while if bookings with smaller periodicity than 100 ms are detected the UE may adjust its sensing window and periodicity accordingly. The UE may use internal timers and revert back to a 100 ms sensing period if no bookings with shorter periodicity are detected at least for a certain time.

Further UE Embodiments

Figure 4:
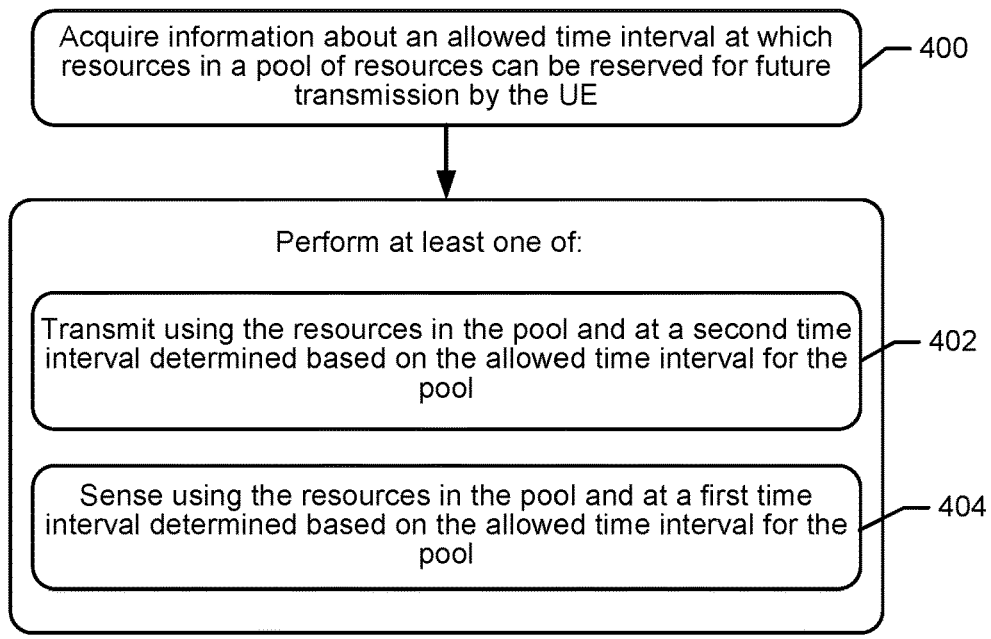
FIGS. 4-8 are flowcharts of operations and methods performed by a UE in accordance with some embodiments.

FIG. 4 is a block diagram of various operations and methods that can be performed by a UE 100 in accordance with at least some embodiments of the present disclosure. Referring to FIG. 4, the method includes acquiring (block 400) information about an allowed time interval at which resources in a pool of resources can be selected or reserved for future transmission by the UE 100. The method further includes performing at least one of:
1) sensing (block 404) using the resources in the pool and at a time interval determined based on the allowed time interval for the pool, where the time interval may be a first time interval.
2) transmitting (block 402) using the resources in the pool and at a time interval determined based on the allowed time interval for the pool, where the time interval may be a second time interval.

The first and second time intervals may be different time intervals.

The UE can then schedule resources for transmission based on an output of the sensing.

The term "at least one of" means the method by the UE 100 includes one of the listed steps of transmitting or sensing, or includes both of the listed steps. Similarly, the term means that the UE 100 is configured to perform one or both the operations corresponding to the steps of transmitting or sensing. However, the term does not mean that the UE 100 is necessarily configured to perform the method or corresponding operations of both steps. Indeed, the UE 100 may only be configured to perform one of those steps.

The term "allowed time interval" can be any time interval that the UE 100 can choose to use, but is not necessarily constrained to use. A pool may be associated with a plurality of time intervals at which resources in the pool can be reserved or selected for future transmission by the UE 100, where one of the time intervals is determined to be the allowed time interval. In some embodiments, the term "allowed time interval" is determined as a minimum time interval identified among a plurality of time intervals at which resources in the pool can be selected for future transmission by the UE. The transmitting (block 402) may include determining a resource utilization interval occurring between transmissions by the UE 100 associated with a service provided by the UE, and indicating the resource utilization interval using the resources in the pool. In embodiments, indicating the resource utilization interval using the resources in the pool, may include transmitting a booking message which indicates to other UEs an intention of the UE to potentially transmit a next transmission using the resources of the pool and at the time interval indicated by the booking message. This may e.g. correspond to that the UE determines the periodicity of the messages that it is supposed to transmit according to the service that the UE is providing, such as the periodicity of the CAM and the DENM messages described in the background section, and then books the resources according to this periodicity.

In a further embodiment of FIG. 4, the method by the UE 100 further includes acquiring (block 500) information about a set of pools of resources. Each pool defines resources that can be selected for future transmission by the UE 100, and each pool has an allowed time interval at which resources can be selected for future transmission by the UE 100. The values for the allowed time intervals of the pools may or may not be different from each other. The method further includes determining (block 502) a resource utilization interval occurring between transmissions by the UE 100 associated with a service provided by the UE 100, and selecting (block 504) a pool of resources from among the set of pools of resources that has an allowed time interval that is not shorter than the resource utilization interval. The UE then performs the at least one of: 1) the transmitting (block 402) using the resources in the pool and at the time interval determined based on the allowed time interval for the pool selected; and 2) the sensing (block 404) using the resources in the pool and at the time interval determined based on the allowed time interval for the pool selected.

The step of determining (block 502) the resource utilization interval occurring between transmissions by the UE associated with a service provided by the UE, may include determining the resource utilization interval based on a minimum interval occurring between transmissions by the UE 100 associated with the service provided by the UE 100.

The step of selecting (block 504) the pool of resources from among the set of pools of resources, may include selecting from among the set of pools of resources, the pool having the allowed time interval that is closest to but not shorter than the resource utilization interval.

The step of performing the sensing (block 404) can include the UE 100 sensing resources periodically, e.g., at least sometime during a repetitively occurring time window, with a time period that is determined based on the allowed time interval of the pool. The sensing (block 404) may include, for example, the UE 100 reading control information, measuring signal strength of sensed signals, measuring power of sensed signals, etc. In some embodiments, the step of performing the sensing (block 404) using the resources in the pool, may include performing a sensing operation by a sensing circuit (e.g., radio transceiver 1320 and/or satellite receiver 1360 of FIG. 13) of the UE 100 using the resources of the pool and according to the time interval determined based on the allowed time interval of the pool, e.g., the pool which is selected in block 504. The step of performing the sensing operation by the sensing circuit 1360, may include performing repetitive switching of a power state (e.g., toggle between lower power or power-off and high power or power-on) of a receiver circuit to repetitively begin listening for signalling from other UEs using the resources and the allowed time interval of the pool. The performing the sensing operation may include performing repetitive switching of a power state (e.g., toggle between lower power or power-off and high power or power-on) of a satellite receiver circuit 1360 (FIG. 13) to repetitively begin listening for signalling from satellites of a satellite positioning system using the resources and the allowed time interval of the pool. More generally, the step of performing the sensing operation by the sensing circuit may include controlling duration of a sleep mode of the UE 100 according to the allowed time interval of the pool.

Figure 5:
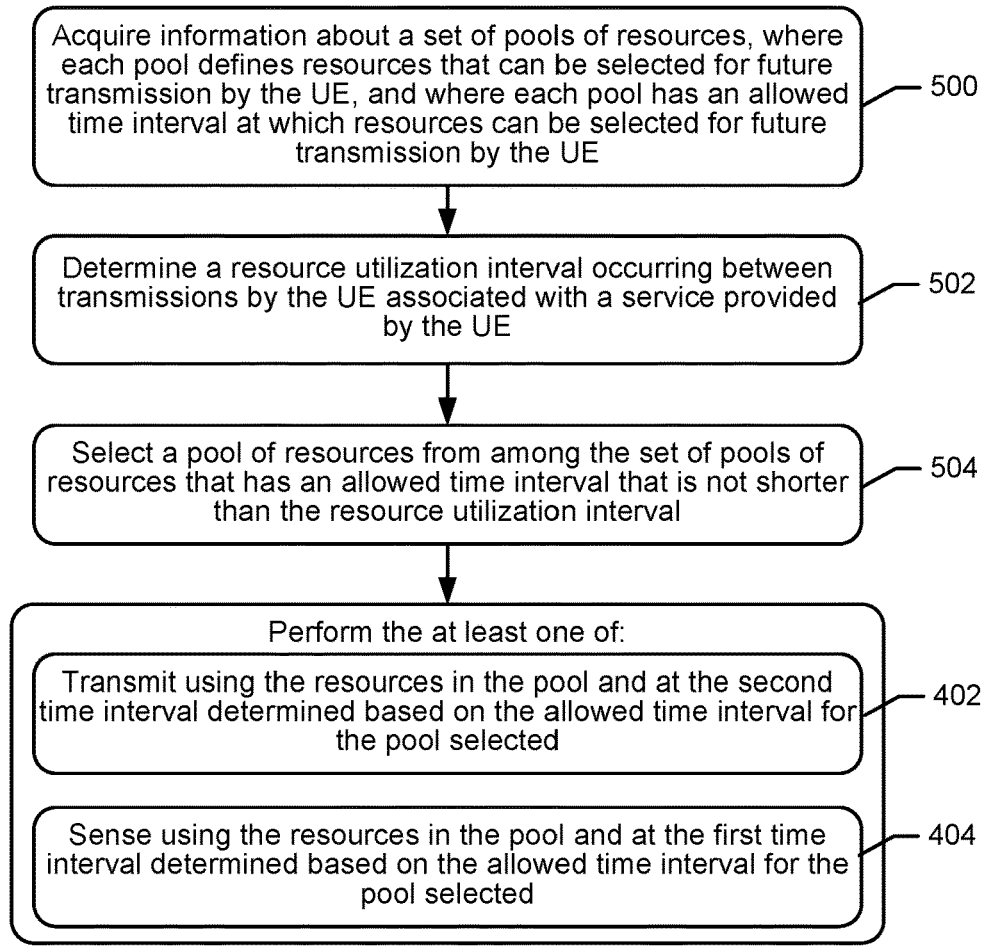
Figure 6:
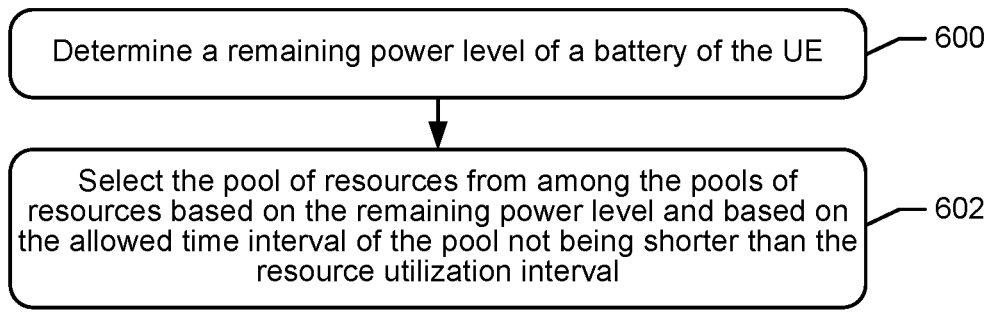

Referring to the embodiment of FIG. 6, the step of selecting (block 504 of FIG. 5) the pool of resources from among the set of pools of resources, includes determining (block 600) a remaining power level of a battery of the UE, and selecting (block 602) the pool of resources from among the pools of resources based on the remaining power level and based on the allowed time interval of the pool not being shorter than the resource utilization interval. The selecting (block 602) of the pool of resources, may further include selecting the pool that has a longer allowed time interval when the remaining power level falls below a threshold level.

Figure 7:
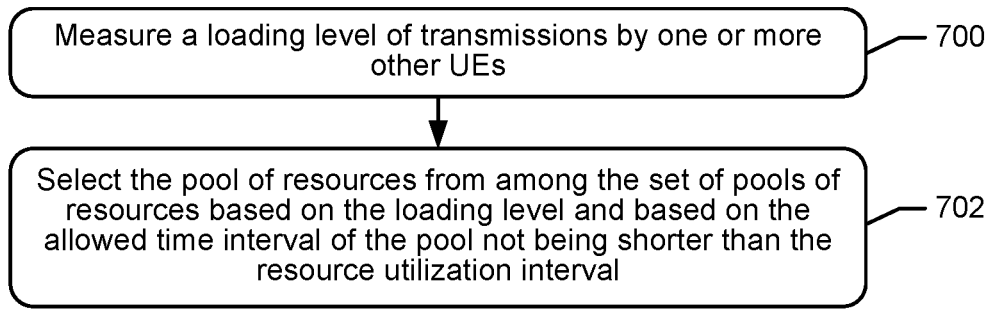

Referring to the other embodiment of FIG. 7, the step of selecting (block 504 of FIG. 5) the pool of resources from among the set of pools of resources, includes measuring (block 700) a loading level of transmissions by one or more other UEs 100, and selecting (block 702) the pool of resources from among the set of pools of resources based on the loading level and based on the allowed time interval of the pool not being shorter than the resource utilization interval. The step of selecting (block 702) may include selecting the pool of resources that has a longer allowed time interval when the loading level is above a threshold level and selecting another pool of resources that has a shorter allowed time interval when the loading level is below the threshold level.

Referring again to FIG. 4, in some embodiments the information defining one or more pools, comprising the information about an allowed time interval at which resources of the pool can be reserved, is acquired (block 400 of FIG. 4) by receiving the information from the network node 110 and/or another UE 100. Alternatively, or additionally, the information may be acquired (block 400) by receiving the information through a received System Information Block (SIB) from the network node 110. In still another alternative or additional embodiment, the information is acquired (block 400) by receiving the information through control signalling from the network node 110 and/or another UE 100. The UE 100 may receive the information defining one or more pools by receiving control information transmitted by the network node 110, e.g., through Radio Resource Control (RRC) signalling, by receiving control information transmitted by another UE 100, e.g., through a Physical Sidelink Control Channel (PSCCH).

Figure 8:
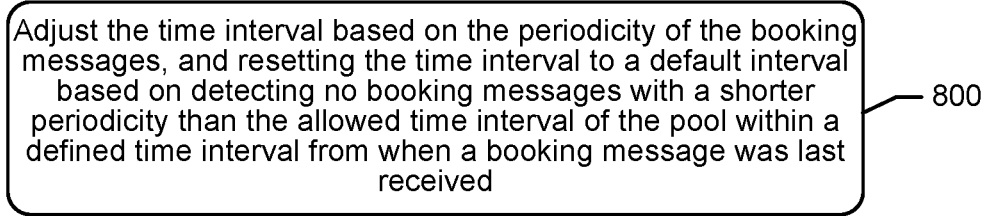

The allowed time interval of one or more pools may be acquired (block 400) based on detecting periodicity of transmissions by at least one other UE 100. Alternatively, or additionally, the allowed time interval of one or more pools is acquired (block 400) based on detecting periodicity of booking messages received from at least one other UE 100. Referring to the further embodiment of FIG. 8, the time interval may be adjusted (block 800) based on the periodicity of the booking messages. The time interval may then be reset to a default interval based on detecting no booking messages with a shorter periodicity than the allowed time interval of the pool within a defined time interval from when a booking message was last received.

The pools, defined by the acquired (block 500) information, may have different allowed time intervals at which resources can be selected for future transmission by the UE 100. Alternatively, or additionally, the acquired information may provide that each of the pools defines time and/or frequency resources allowed to be selected or reserved for future transmission by the UE 100 and which do not overlap with the time and/or frequency resources of the other pools. Still alternatively or additionally, the acquired information may provide that each of the pools define time and/or frequency resources allowed to be selected or reserved for future transmission by the UE 100 and which at least partially overlap with the time and/or frequency resources of the other pools.

Further Network Node Embodiments

Figure 9:
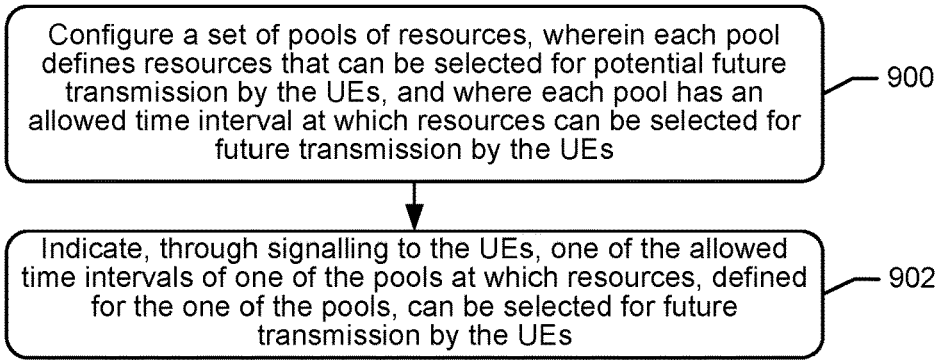
FIGS. 9-12 are flowcharts of operations and methods performed by a network node in accordance with some embodiments.

Some further embodiments are directed to operations and methods by the network node 110 for communicating with UEs 100. FIG. 9 illustrates a method and corresponding operations that can be performed by the network node 110. The method includes configuring (block 900) a set of pools of resources. Each pool defines resources that can be selected for potential future transmission by the UEs 100, and each pool has an allowed time interval at which resources can be reserved or selected for future transmission by the UEs 100. The method further includes indicating (block 902), through signalling to the UEs 100, one of the allowed time intervals of one of the pools at which resources, defined for the one of the pools, can be reserved or selected for future transmission by the UEs 100. This step may correspond to the step 400 in the UE.

The allowed time interval may be determined as a minimum time interval identified among a plurality of time intervals of the one of the pools at which resources in the one of the pools can be selected for future transmission by the UEs 100.

Figure 10:
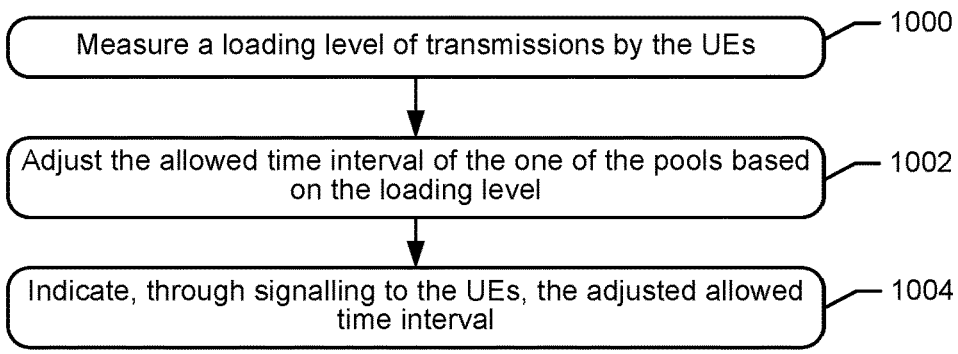

In the embodiment of FIG. 10, the method and corresponding operations by the network node 110 further include measuring (block 1000) a loading level of transmissions by the UEs 100, adjusting (block 1002) the allowed time interval of the one of the pools based on the loading level, and indicating (block 1004), through signalling to the UEs 100, the adjusted allowed time interval.

Figure 11:
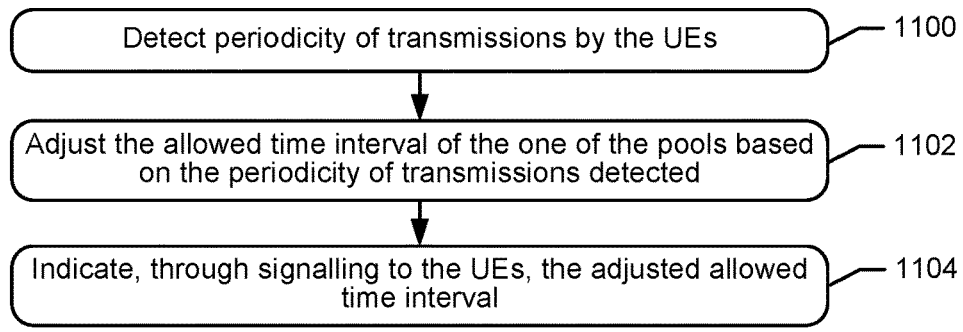
Figure 12:
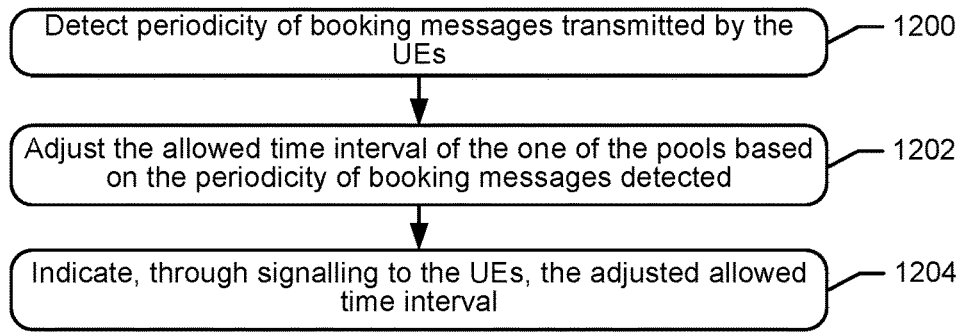

In another embodiment shown in FIG. 11, the method and corresponding operations by the network node 110 further include detecting (block 1100) periodicity of transmissions by the UEs 100, adjusting (block 1102) the allowed time interval of the one of the pools based on the periodicity of transmissions detected, and indicating (block 1104), through signalling to the UEs 100, the adjusted allowed time interval.

In still another embodiment shown in FIG. 11, the method and corresponding operations by the network node 110 further include detecting (block 1200) periodicity of booking messages transmitted by the UEs 100, adjusting (block 1202) the allowed time interval of the one of the pools based on the periodicity of booking messages detected, and indicating (block 1204), through signalling to the UEs 100, the adjusted allowed time interval. The allowed time interval of the one of the pools may be adjusted (block 1202) based on detecting no booking messages with a shorter periodicity than the allowed time interval of the one of the pools.

The pools may be configured to have different allowed time intervals at which resources can be selected for potential future transmission by the UEs 100. Each of the pools may be configured to define time and/or frequency resources that can be selected for potential future transmission by the UEs 100 and which do not overlap with the time and/or frequency resources of the other pools. In another embodiment, each of the pools is configured to define time and/or frequency resources that can be selected for potential future transmission by the UEs 100 and which at least partially overlap with the time and/or frequency resources of the other pools.

Example User Equipment and Network Node

Figure 13:
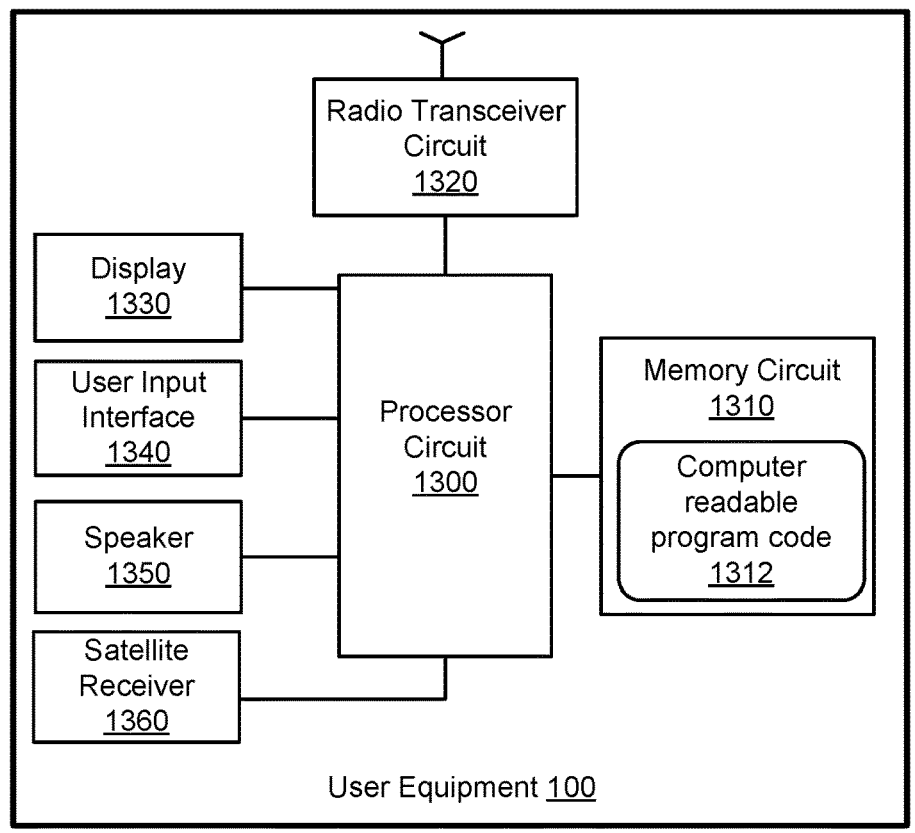
FIG. 13 is a block diagram of a UE configured according to some embodiments of the present disclosure.

FIG. 13 is a block diagram of a UE 100, for use in a telecommunications system, that is configured to perform operations according to one or more embodiments disclosed herein.

In one embodiment, the UE (100) is configured to acquire information about an allowed time interval at which resources in a pool of resources can be reserved for future transmission by the UE (100), and sense using the resources in the pool and at a first time interval determined based on the allowed time interval for the pool.

The UE (100) may be further configured to transmit using the resources in the pool and at a second time interval determined based on the allowed time interval for the pool. The UE (100) may be further configured to transmit by determining a resource utilization interval occurring between transmissions by the UE associated with a service provided by the UE, and indicating the resource utilization interval using the resources in the pool. The indicating may be done by transmitting a booking message which indicates to other UEs an intention of the UE to potentially transmit a next transmission using the resources in the pool and at the time interval indicated by the booking message.

In embodiments, the UE (100) may be configured to determine the allowed time interval as a minimum time interval identified among a plurality of time intervals at which resources in the pool can be selected for future transmission by the UE (100). The allowed time interval may define a resource reservation period.

In embodiments, the UE (100) may be further configured to acquire information about a set of pools of resources, wherein each pool defines resources that can be selected for future transmission by the UE (100), and wherein each pool has a respective different allowed time interval at which resources can be selected for future transmission by the UE (100). The UE may be further configured to determine a resource utilization interval occurring between transmissions by the UE associated with a service provided by the UE (100), select a pool of resources from among the set of pools of resources that has an allowed time interval that is not shorter than the resource utilization interval, and perform the sensing using the resources in the pool and at the time interval determined based on the allowed time interval for the pool selected.

The UE (100) may be further configured to determine the resource utilization interval occurring between transmissions by the UE associated with a service provided by the UE, by determining the resource utilization interval based on a minimum interval occurring between transmissions by the UE associated with the service provided by the UE.

In embodiments, the UE (100) may be further configured to schedule resources for transmission based on an output of the sensing.

The UE (100) may be further comprising a sensing circuit configured to sense using the resources in the pool, by performing a sensing operation using the resources of the pool and according to the time interval determined based on the allowed time interval of the pool. The sensing circuit may be configured to perform the sensing operation by performing repetitive switching of a power state of a receiver circuit to repetitively begin listening for signalling from other UEs using the resources and the allowed time interval of the pool. The sensing circuit may be configured to perform the sensing operation by controlling duration of a sleep mode of the UE according to the allowed time interval of the pool.

In embodiments, the UE (100) may be configured to select the pool of resources from among the set of pools of resources that has the allowed time interval that is not shorter than the resource utilization interval, by determining a remaining power level of a battery of the UE; and selecting the pool of resources from among the pools of resources based on the remaining power level and based on the allowed time interval of the pool not being shorter than the resource utilization interval.

The UE (100) may be configured to select the pool of resources from among the set of pools of resources that has the allowed time interval that is not shorter than the resource utilization interval, by measuring a loading level of transmissions by one or more other UEs; and selecting the pool of resources from among the set of pools of resources based on the loading level and based on the allowed time interval of the pool not being shorter than the resource utilization interval.

In another embodiment, the UE (100) may be configured to acquire the information by receiving the information from a network node (110) and/or another UE (100). The UE (100) may be configured to acquire the allowed time interval of the pool based on detecting: periodicity of transmissions by at least one other UE (100), or periodicity of booking messages received from the at least one other UE (100).

In embodiments, each of the pools defines time and/or frequency resources allowed to be selected for future transmission by the UE (100) and which at least partially overlap or do not overlap with the time and/or frequency resources of the other pools.

As illustrated in FIG. 13, the UE 100 may include a radio transceiver circuit 1320, at least one processor circuit 1300, and at least one memory circuit 1310 containing computer readable program code 1312. The UE 100 may further include a satellite receiver 1360, a display 1330, a user input interface 1340, and a speaker 1350.

Figure 1:
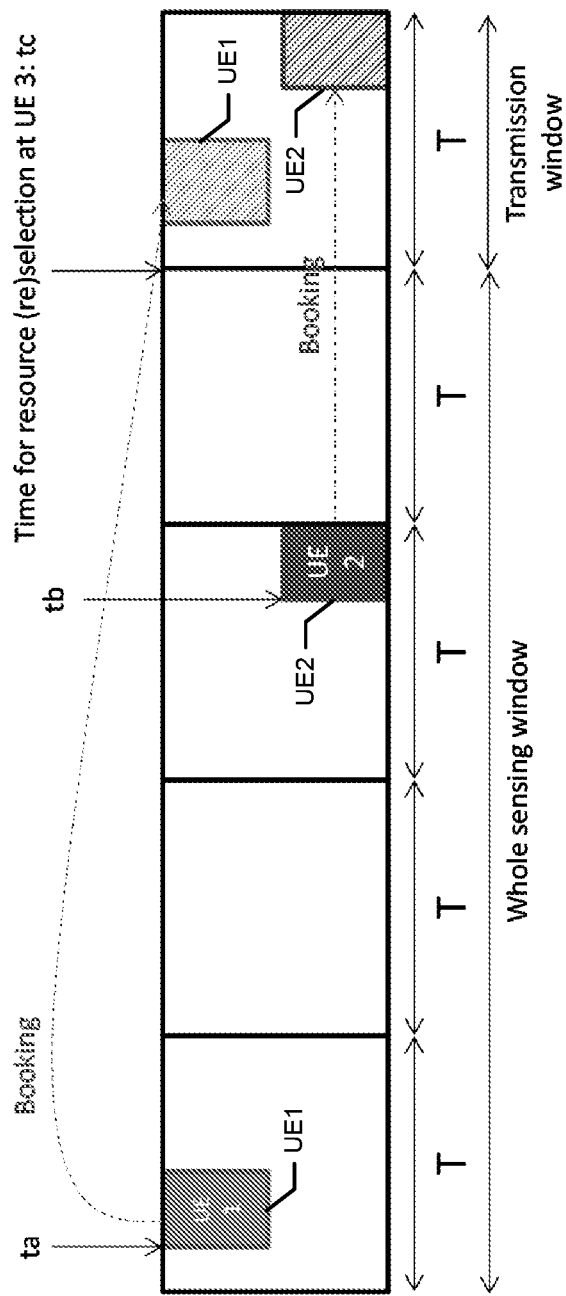
FIG. 1 is an operation timing diagram illustrating a sensing-based resource selection mechanism over a whole window and booking operations by UEs according to the prior art.

The transceiver circuit 1320 is configured to communicate with other UEs, which—as explained in FIG. 1—may correspond to infrastructure mounted devices, vehicle mounted/carried devices, pedestrian carried devices, etc. and the network node 110, through a wireless air interface using one or more of the radio access technologies. The processor circuit 1300 may include one or more data processing circuits, such as a general purpose and/or special purpose processor, e.g., microprocessor and/or digital signal processor. The processor circuit 1300 is configured to execute the computer readable program code 1312 in the memory circuit 1310 to perform at least some of the operations described herein as being performed by a UE 100.

Figure 14:
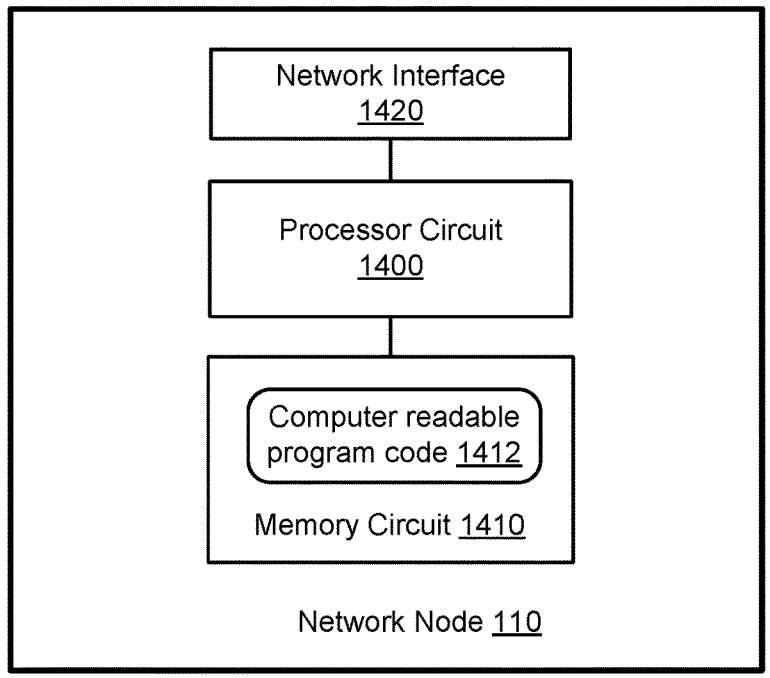
FIG. 14 is a block diagram of a network node configured according to some embodiments of the present disclosure.

FIG. 14 is a block diagram of the network node 110 which includes a network interface 1420 (e.g., wired network interface and/or wireless transceiver), at least one processor circuit 1400, and at least one memory circuit 1410 containing computer readable program code 1412.

The processor circuit 1400 may include one or more data processing circuits, such as a general purpose and/or special purpose processor, e.g., microprocessor and/or digital signal processor, that may be collocated or distributed across one or more networks. The processor circuit 1400 is configured to execute the computer readable program code 1412 in the memory 1410 to perform at least some of the operations and methods of described herein as being performed by a network node 110. The network interface 1420 is coupled to the processor circuit 1400 and communicates with UEs 100 directly or indirectly through one or more other network nodes and/or other UEs.

Example Modules

Figure 15:
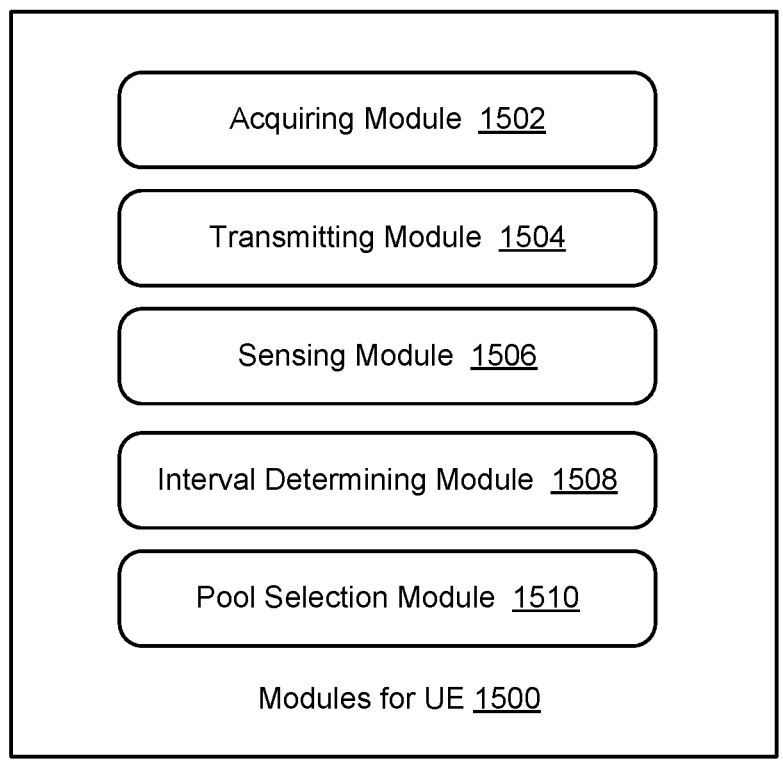
FIG. 15 illustrates modules for a UE that perform operations as disclosed herein according to some embodiments.

FIG. 15 illustrates modules 1500 for a UE that perform operations as disclosed herein according to some embodiments. The modules 1500 include an acquiring module 1502 for acquiring (block 400 of FIG. 4) information about an allowed time interval at which resources in a pool of resources can be reserved for future transmission by the UE 100. The modules 1500 further include at least at least one of: 1) a transmitting module 1504 for transmitting (block 402) using the resources in the pool and at a second time interval determined based on the allowed time interval for the pool; and 2) a sensing module 1506 for sensing (404) using the resources in the pool and at a first time interval determined based on the allowed time interval for the pool.

The acquiring module 1502 may be further for acquiring (block 500 of FIG. 5) information about a set of pools of resources, wherein each pool defines resources that can be reserved or selected for future transmission by the UE 100, and where each pool has an allowed time interval at which resources can be reserved for future transmission by the UE 100. The acquiring module 1502 may further include an interval determining module 1508 and a pool selection module 1510. The interval determining module 1508 is for determining (block 502) a resource utilization interval occurring between transmissions by the UE associated with a service provided by the UE 100. The pool selection module 1510 is for selecting (block 504) a pool of resources from among the set of pools of resources that has an allowed time interval that is not shorter than the resource utilization interval. The transmitting module (1504), when included, may be for transmitting (block 402) using the resources in the pool and at the second time interval determined based on the allowed time interval for the pool selected. The sensing module 1506, when included, may be for sensing (block 404) using the resources in the pool and at the first time interval determined based on the allowed time interval for the pool selected. The modules 1502-1510 can be configured to perform the other corresponding operations and methods disclosed herein for a UE.

Figure 16:
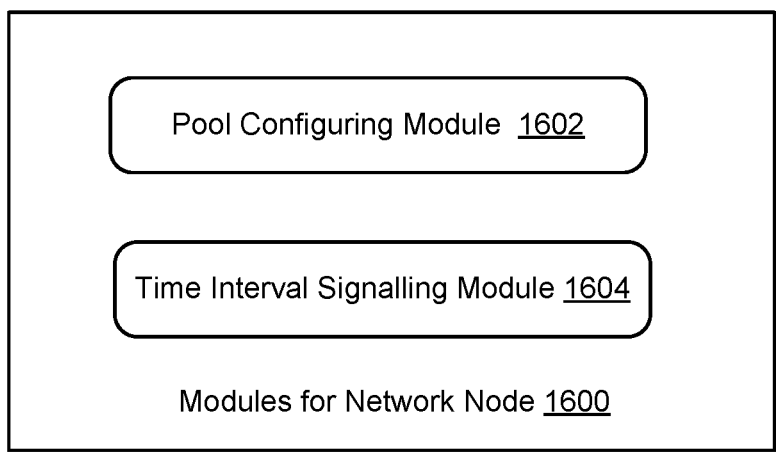
FIG. 16 illustrates modules for a network node that perform operations as disclosed herein according to some embodiments.

FIG. 16 illustrates modules 1600 for a network node that perform operations as disclosed herein according to some embodiments. The modules 1600 include a pool configuring module 1602 for configuring (block 900 of FIG. 9) a set of pools of resources, where each pool defines resources that can be selected for potential future transmission by the UEs 100, and where each pool has an allowed time interval at which resources can be reserved or selected for future transmission by the UEs 100. The modules 1600 further include a time interval signalling module 1604 for indicating (block 902), through signalling to the UEs 100, one of the allowed time intervals of one of the pools at which resources, defined for the one of the pools, can be reserved or selected for future transmission by the UEs 100. The modules 1602-1604 can be configured to perform the other corresponding operations and methods disclosed herein for a network node.

Abbreviations and Explanations

3G Third Generation of Mobile Telecommunications Technology
BSM Basic Safety Message
BW Bandwidth
CAM Cooperative Awareness Message
CDMA Code-Division Multiple Access
D2D Device-to-Device Communication
DENM Decentralized Environmental Notification Message
DSRC Dedicated Short-Range Communications
eNB eNodeB
ETSI European Telecommunications Standards Institute
FDMA Frequency-Division Multiple Access
GLONASS Global Navigation Satellite System
GSM Glbal System for Mobile Communications
GPS Global Positioning System
LTE Long-Term Evolution
NW Network
OFDM Orthogonal-Frequency-Division Multiplexing
PSBCH Physical Sidelink Broadcast Channel
TA Timing Advance
TDMA Time-Division Multiple Access
TF Transport Format
UTC Coordinated Universal Time
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-any electronic communication device

LISTING OF EMBODIMENTS

Embodiment 1

A method by a user equipment, UE, (100) comprising:
acquiring (400) information about an allowed time interval at which resources in a pool of resources can be selected for future transmission by the UE (100); and
performing at least one of:
transmitting (402) using the resources in the pool and at a time interval determined based on the allowed time interval for the pool; and sensing (404) using the resources in the pool and at a time interval determined based on the allowed time interval for the pool.

Embodiment 2

The method of Embodiment 1, wherein the transmitting (402) using the resources in the pool and at the time interval determined based on the allowed time interval for the pool, comprises:
determining a resource utilization interval occurring between transmissions by the UE associated with a service provided by the UE; and
indicating the resource utilization interval using the resources in the pool.

Embodiment 3

The method of any of Embodiments 1 through 2, wherein the allowed time interval is determined as a minimum time interval identified among a plurality of time intervals at which resources in the pool can be selected for future transmission by the UE (100).

Embodiment 4

The method of any of Embodiments 1 through 3, further comprising:
acquiring (500) information about a set of pools of resources, wherein each pool defines resources that can be selected for future transmission by the UE (100), and wherein each pool has an allowed time interval at which resources can be selected for future transmission by the UE (100);
determining (502) a resource utilization interval occurring between transmissions by the UE associated with a service provided by the UE (100);
selecting (504) a pool of resources from among the set of pools of resources that has an allowed time interval that is not shorter than the resource utilization interval; and
performing the at least one of:
transmitting (402) using the resources in the pool and at the time interval determined based on the allowed time interval for the pool selected; and
sensing (404) using the resources in the pool and at the time interval determined based on the allowed time interval for the pool selected.

Embodiment 5

The method of Embodiment 4, wherein the determining (502) the resource utilization interval occurring between transmissions by the UE associated with a service provided by the UE, comprises:
determining the resource utilization interval based on a minimum interval occurring between transmissions by the UE associated with the service provided by the UE.

Embodiment 6

The method of any of Embodiments 4 through 5, wherein the selecting (504) the pool of resources from among the set of pools of resources that has the allowed time interval that is not shorter than the resource utilization interval, comprises:
selecting from among the set of pools of resources, the pool having the allowed time interval that is closest to but not shorter than the resource utilization interval.

Embodiment 7

The method of any of Embodiments 1 through 6, wherein the performing the transmitting (402) using the resources in the pool, comprises:
transmitting a booking message which indicates to other UEs an intention of the UE to potentially transmit a next transmission using the resources in the pool and at the time interval indicated by the booking message.

Embodiment 8

The method of any of Embodiments 1 through 7, wherein the performing the sensing (404) using the resources in the pool, comprises:
performing a sensing operation by a sensing circuit of the UE using the resources of the pool and according to the time interval determined based on the allowed time interval of the pool.

Embodiment 9

The method of Embodiment 8, wherein the performing the sensing operation by the sensing circuit comprises performing repetitive switching of a power state of a receiver circuit to repetitively begin listening for signalling from other UEs using the resources and the allowed time interval of the pool.

Embodiment 10

The method of any of Embodiments 8 through 9, wherein the performing the sensing operation by the sensing circuit comprises performing repetitive switching of a power state of a satellite receiver circuit to repetitively begin listening for signalling from satellites of a satellite positioning system using the resources and the allowed time interval of the pool.

Embodiment 11

The method of any of Embodiments 8 through 10, wherein the performing the sensing operation by the sensing circuit comprises controlling duration of a sleep mode of the UE according to the allowed time interval of the pool.

Embodiment 12

The method of any of Embodiments 4 through 11, wherein the selecting (504) the pool of resources from among the set of pools of resources that has the allowed time interval that is not shorter than the resource utilization interval, comprises:
determining (600) a remaining power level of a battery of the UE; and
selecting (602) the pool of resources from among the pools of resources based on the remaining power level and based on the allowed time interval of the pool not being shorter than the resource utilization interval.

Embodiment 13

The method of Embodiment 12, wherein the selecting (602) the pool of resources from among the pools of resources based on the remaining power level and based on the allowed time interval of the pool not being shorter than the resource utilization interval, comprises:

selecting the pool that has a longer allowed time interval when the remaining power level falls below a threshold level.

Embodiment 14

The method of any of Embodiments 4 through 13, wherein the selecting (504) the pool of resources from among the set of pools of resources that has the allowed time interval that is not shorter than the resource utilization interval, comprises:

measuring (700) a loading level of transmissions by one or more other UEs; and selecting (702) the pool of resources from among the set of pools of resources based on the loading level and based on the allowed time interval of the pool not being shorter than the resource utilization interval.

Embodiment 15

The method of Embodiment 14, wherein the selecting (702) the pool of resources from among the set of pools of resources based on the loading level and based on the allowed time interval of the pool not being shorter than the resource utilization interval, comprises:

selecting the pool of resources that has a longer allowed time interval when the loading level is above a threshold level and selecting another pool of resources that has a shorter allowed time interval when the loading level is below the threshold level.

Embodiment 16

The method of any of Embodiments 1 through 15, wherein the information is acquired (400) by receiving the information from a network node (110) and/or another UE (100).

Embodiment 17

The method of any of Embodiments 1 through 16, wherein the information is acquired (400) by receiving the information through a received System Information Block, SIB, from a network node (110).

Embodiment 18

The method of any of Embodiments 1 through 17, wherein the information is acquired (400) by receiving the information through control signalling from a network node (110) and/or another UE (100).

Embodiment 19

The method of any of Embodiments 1 through 18, wherein the allowed time interval of the pool is acquired (400) based on detecting periodicity of transmissions by at least one other UE (100).

Embodiment 20

The method of Embodiment 19, wherein the allowed time interval of the pool is acquired (400) based on detecting periodicity of booking messages received from the at least one other UE (100).

Embodiment 21

The method of Embodiment 20, further comprising adjusting (800) the time interval based on the periodicity of the booking messages, and resetting the time interval to a default interval based on detecting no booking messages with a shorter periodicity than the allowed time interval of the pool within a defined time interval from when a booking message was last received.

Embodiment 22

The method of any of Embodiments 4 through 21, wherein the pools have different allowed time intervals at which resources can be selected for future transmission by the UE (100).

Embodiment 23

The method of any of Embodiments 4 through 22, wherein each of the pools defines time and/or frequency resources allowed to be selected for future transmission by the UE (100) and which do not overlap with the time and/or frequency resources of the other pools.

Embodiment 24

The method of any of Embodiments 4 through 22, wherein each of the pools define time and/or frequency resources allowed to be selected for future transmission by the UE (100) and which at least partially overlap with the time and/or frequency resources of the other pools.

Embodiment 25

A computer program product comprising a non-transitory computer readable medium storing program code that when executed by a processor of a UE (100) causes the UE (100) to perform operations of the method of any of Claims 1 to 24.

Embodiment 26

A user equipment, UE, (100) comprising:
a radio transceiver (1320);
at least one processor (1300); and
at least one memory (1310) coupled to the at least one processor (1300) and the radio transceiver (1320), and storing program code (1312) that when executed by the at least one processor (1300) causes the at least one processor (1300) to perform operations comprising:
acquiring (400) information about an allowed time interval at which resources in a pool of resources can be selected for future transmission by the UE (100); and
performing at least one of:
transmitting (402) using the resources in the pool and at a time interval determined based on the allowed time interval for the pool; and sensing (404) using the resources in the pool and at a time interval determined based on the allowed time interval for the pool.

Embodiment 27

The UE (100) of Embodiment 26, wherein the operations further comprise:
acquiring (500) information about a set of pools of resources, wherein each pool defines resources that can be selected for future transmission by the UE, and wherein each pool has an allowed time interval at which resources can be selected for future transmission by the UE;
determining (502) a resource utilization interval occurring between transmissions by the UE associated with a service provided by the UE;
selecting (504) a pool of resources from among the set of pools of resources that has an allowed time interval that is not shorter than the resource utilization interval; and
performing the at least one of:
transmitting (402) using the resources in the pool and at the time interval determined based on the allowed time interval for the pool selected;
and sensing (404) using the resources in the pool and at the time interval determined based on the allowed time interval for the pool selected.

Embodiment 28

The UE (100) of Embodiment 27, wherein the selecting (504) the pool of resources from among the set of pools of resources that has the allowed time interval that is not shorter than the resource utilization interval, comprises:
selecting from among the set of pools of resources, the pool having the allowed time interval that is closest to but not shorter than the resource utilization interval.

Embodiment 29

A user equipment, UE, (100) comprising:
an acquiring module (1502) for acquiring (400) information about an allowed time interval at which resources in a pool of resources can be selected for future transmission by the UE (100); and
at least at least one of:
a transmitting module (1504) for transmitting (402) using the resources in the pool and at a time interval determined based on the allowed time interval for the pool; and
a sensing module (1506) for sensing (404) using the resources in the pool and at a time interval determined based on the allowed time interval for the pool.

Embodiment 30

The UE (100) of Embodiment 29,
wherein the acquiring module (1502) is further for acquiring (500) information about a set of pools of resources, wherein each pool defines resources that can be selected for future transmission by the UE (100), and wherein each pool has an allowed time interval at which resources can be selected for future transmission by the UE (100), and
further comprising:
an interval determining module (1508) for determining (502) a resource utilization interval occurring between transmissions by the UE associated with a service provided by the UE (100); and
a pool selection module (1510) for selecting (504) a pool of resources from among the set of pools of resources that has an allowed time interval that is not shorter than the resource utilization interval,
wherein:
the transmitting module (1504) is for transmitting (402) using the resources in the pool and at the time interval determined based on the allowed time interval for the pool selected, and
the sensing module (1506) is for sensing (404) using the resources in the pool and at the time interval determined based on the allowed time interval for the pool selected.

Embodiment 31

A user equipment, UE, (100) configured to:
acquire (400) information about an allowed time interval at which resources in a pool of resources can be selected for future transmission by the UE (100); and
perform at least one of:
transmit (402) using the resources in the pool and at a time interval determined based on the allowed time interval for the pool; and
sense (404) using the resources in the pool and at a time interval determined based on the allowed time interval for the pool.

Embodiment 32

The UE (100) of Embodiment 31 further configured to:
acquire (500) information about a set of pools of resources, wherein each pool defines resources that can be selected for future transmission by the UE (100), and wherein each pool has an allowed time interval at which resources can be selected for future transmission by the UE (100), and
determine (502) a resource utilization interval occurring between transmissions by the UE associated with a service provided by the UE (100);
select (504) a pool of resources from among the set of pools of resources that has an allowed time interval that is not shorter than the resource utilization interval; and
perform the at least one of:
transmitting (402) using the resources in the pool and at the time interval determined based on the allowed time interval for the pool selected; and
sensing (404) using the resources in the pool and at the time interval determined based on the allowed time interval for the pool selected.

Embodiment 33

A method by a network node (110) for communicating with UEs (100), the method comprising:
configuring (900) a set of pools of resources, wherein each pool defines resources that can be selected for potential future transmission by the UEs (100), and wherein each pool has an allowed time interval at which resources can be selected for future transmission by the UEs (100); and
indicating (902), through signalling to the UEs (100), one of the allowed time intervals of one of the pools at which resources, defined for the one of the pools, can be selected for future transmission by the UEs (100).

Embodiment 34

The method of Embodiment 33, wherein the allowed time interval is determined as a minimum time interval identified among a plurality of time intervals of the one of the pools at which resources in the one of the pools can be selected for future transmission by the UEs (100).

Embodiment 35

The method of any of Embodiments 33 through 34, further comprising:
measuring (1000) a loading level of transmissions by the UEs (100);
adjusting (1002) the allowed time interval of the one of the pools based on the loading level; and
indicating (1004), through signalling to the UEs (100), the adjusted allowed time interval.

Embodiment 36

The method of any of Embodiments 33 through 35, further comprising:
detecting (1100) periodicity of transmissions by the UEs (100);
adjusting (1102) the allowed time interval of the one of the pools based on the periodicity of transmissions detected; and
indicating (1104), through signalling to the UEs (100), the adjusted allowed time interval.

Embodiment 37

The method of any of Embodiments 33 through 36, further comprising:
detecting (1200) periodicity of booking messages transmitted by the UEs (100);
adjusting (1202) the allowed time interval of the one of the pools based on the periodicity of booking messages detected; and
indicating (1204), through signalling to the UEs (100), the adjusted allowed time interval.

Embodiment 38

The method of Embodiment 37, further comprising adjusting (1202) the allowed time interval of the one of the pools based on detecting no booking messages with a shorter periodicity than the allowed time interval of the one of the pools.

Embodiment 39

The method of any of Embodiments 33 through 38, wherein the pools are configured to have different allowed time intervals at which resources can be selected for potential future transmission by the UEs (100).

Embodiment 40

The method of any of Embodiments 33 through 39, wherein each of the pools is configured to define time and/or frequency resources that can be selected for potential future transmission by the UEs (100) and which do not overlap with the time and/or frequency resources of the other pools.

Embodiment 41

The method of any of Embodiments 33 through 39, wherein each of the pools is configured to define time and/or frequency resources that can be selected for potential future transmission by the UEs (100) and which at least partially overlap with the time and/or frequency resources of the other pools.

Embodiment 42

A computer program product comprising a non-transitory computer readable medium storing program code that when executed by a processor of a network node causes the network node to perform operations of the method of any of claims 33 to 41.

Embodiment 43

A network node (110) for communicating with UEs (100), the network node (110) comprising:
at least one processor (1400); and
at least one memory (1410) coupled to the at least one processor (1400), and storing program code (1412) that when executed by the at least one processor (1400) causes the at least one processor (1400) to perform operations comprising:
configuring (900) a set of pools of resources, wherein each pool defines resources that can be selected for potential future transmission by the UEs (100), and wherein each pool has an allowed time interval at which resources can be selected for future transmission by the UEs (100); and
indicating (902), through signalling to the UEs (100), one of the allowed time intervals of one of the pools at which resources, defined for the one of the pools, can be selected for future transmission by the UEs (100).

Embodiment 44

A network node (110) for communicating with UEs (100), the network node comprising:
a pool configuring module (1602) for configuring (900) a set of pools of resources, wherein each pool defines resources that can be selected for potential future transmission by the UEs (100), and wherein each pool has an allowed time interval at which resources can be selected for future transmission by the UEs (100); and
a time interval signalling module (1604) for indicating (902), through signalling to the UEs (100), one of the allowed time intervals of one of the pools at which resources, defined for the one of the pools, can be selected for future transmission by the UEs (100).

Embodiment 45

A network node (110) for communicating with UEs (100), the network node (110) configured to:
configure (900) a set of pools of resources, wherein each pool defines resources that can be selected for potential future transmission by the UEs (100), and wherein each pool has an allowed time interval at which resources can be selected for future transmission by the UEs (100); and
indicate (902), through signalling to the UEs (100), one of the allowed time intervals of one of the pools at which resources, defined for the one of the pools, can be selected for future transmission by the UEs (100).

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus or computer program product to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

DOCUMENTS REFERENCED HEREIN 1. 3GPP TR 36.843: "Study on LTE Device to Device Proximity Services"

2. 3GPP TR 36.885, "Study on LTE-based V2X Services"
3. R1-166965, "Discussion on P2x", source Ericsson. RAN #86
4. RP-161894, "Revised WID on LTE-based V2X Services", source LG Electronics, Huawei, CATT

The invention claimed is:

1. A method by a user equipment, UE, comprising:
acquiring information about an allowed time interval at which resources in a pool of resources can be reserved for future transmission by the UE; and
sensing using the resources in the pool and at a first time interval determined based on the allowed time interval for the pool,
wherein the allowed time interval is determined as a minimum time interval identified among a plurality of time intervals at which resources in the pool can be selected for future transmission by the UE.

2. The method of claim 1, further comprising transmitting using the resources in the pool and at a second time interval determined based on the allowed time interval for the pool.

3. The method of claim 2, wherein the transmitting comprises:
determining a resource utilization interval occurring between transmissions by the UE associated with a service provided by the UE; and
indicating the resource utilization interval using the resources in the pool, and wherein indicating comprises transmitting a booking message which indicates to other UEs an intention of the UE to potentially transmit a next transmission using the resources in the pool and at the time interval indicated by the booking message.

4. The method of claim 1, wherein the allowed time interval defines a resource reservation period.

5. The method of claim 1, further comprising:
acquiring information about a set of pools of resources, wherein each pool defines resources that can be selected for future transmission by the UE, and wherein each pool has a respective allowed time interval at which resources can be selected for future transmission by the UE;
determining a resource utilization interval occurring between transmissions by the UE associated with a service provided by the UE;
selecting a pool of resources from among the set of pools of resources that has an allowed time interval that is not shorter than the resource utilization interval; and
performing the sensing using the resources in the pool and at the time interval determined based on the allowed time interval for the pool selected.

6. The method of claim 5, wherein the determining the resource utilization interval occurring between transmissions by the UE associated with a service provided by the UE, comprises:
determining the resource utilization interval based on a minimum interval occurring between transmissions by the UE associated with the service provided by the UE.

7. The method of claim 1, further comprising:
scheduling resources for transmission based on an output of the sensing.

8. The method of claim 1, wherein the sensing using the resources in the pool, comprises:
performing a sensing operation by a sensing circuit of the UE using the resources of the pool and according to the time interval determined based on the allowed time interval of the pool.

9. The method of claim 8, wherein the performing the sensing operation by the sensing circuit comprises performing repetitive switching of a power state of a receiver circuit to repetitively begin listening for signalling from other UEs using the resources and the allowed time interval of the pool.

10. A computer program product comprising a non-transitory computer readable medium storing a computer program comprising program code that when executed by a processor of a UE causes the UE to perform operations of the method of claim 1.

11. A user equipment, UE, comprising:
a radio transceiver circuit;
a processor circuit; and
a memory circuit coupled to the at least one processor circuit and the radio transceiver circuit, and storing program code that when executed by the at least one processor circuit causes the at least one processor circuit to perform operations comprising:
acquiring information about an allowed time interval at which resources in a pool of resources can be reserved for future transmission by the UE; and
sensing using the resources in the pool and at a first time interval determined based on the allowed time interval for the pool,
wherein the allowed time interval is determined as a minimum time interval identified among a plurality of time intervals at which resources in the pool can be selected for future transmission by the UE.

12. The UE of claim 11, wherein the at least one processor circuit is further configured to perform the operation of transmitting using the resources in the pool and at a second time interval determined based on the allowed time interval for the pool.

13. The UE of claim 12, wherein the transmitting comprises:
determining a resource utilization interval occurring between transmissions by the UE associated with a service provided by the UE; and
indicating the resource utilization interval using the resources in the pool, and wherein indicating comprises transmitting a booking message which indicates to other UEs an intention of the UE to potentially transmit a next transmission using the resources in the pool and at the time interval indicated by the booking message.

14. The UE of claim 11, wherein the allowed time interval defines a resource reservation period.

15. The UE of claim 11, wherein the at least one processor circuit is further configured to perform the operations of:
acquiring information about a set of pools of resources, wherein each pool defines resources that can be selected for future transmission by the UE, and wherein each pool has a respective allowed time interval at which resources can be selected for future transmission by the UE;
determining a resource utilization interval occurring between transmissions by the UE associated with a service provided by the UE;
selecting a pool of resources from among the set of pools of resources that has an allowed time interval that is not shorter than the resource utilization interval; and
performing the sensing using the resources in the pool and at the time interval determined based on the allowed time interval for the pool selected.

16. The UE of claim 15, wherein the determining the resource utilization interval occurring between transmissions by the UE associated with a service provided by the UE, comprises:

determining the resource utilization interval based on a minimum interval occurring between transmissions by the UE associated with the service provided by the UE.

17. The UE of claim 11, wherein the at least one processor circuit is further configured to perform the operation of:
scheduling resources for transmission based on an output of the sensing.

18. The UE of claim 11, wherein the sensing using the resources in the pool, comprises:
performing a sensing operation by a sensing circuit of the UE using the resources of the pool and according to the time interval determined based on the allowed time interval of the pool.

19. The UE of claim 18, wherein the performing the sensing operation by the sensing circuit comprises performing repetitive switching of a power state of a receiver circuit to repetitively begin listening for signalling from other UEs using the resources and the allowed time interval of the pool.

20. The UE of claim 18, wherein the performing the sensing operation by the sensing circuit comprises controlling duration of a sleep mode of the UE according to the allowed time interval of the pool.

21. The UE of claim 15, wherein the selecting the pool of resources from among the set of pools of resources that has the allowed time interval that is not shorter than the resource utilization interval, comprises:
determining a remaining power level of a battery of the UE; and
selecting the pool of resources from among the pools of resources based on the remaining power level and based on the allowed time interval of the pool not being shorter than the resource utilization interval.

22. The UE of claim 15, wherein the selecting the pool of resources from among the set of pools of resources that has the allowed time interval that is not shorter than the resource utilization interval, comprises:
measuring a loading level of transmissions by one or more other UEs; and
selecting the pool of resources from among the set of pools of resources based on the loading level and based on the allowed time interval of the pool not being shorter than the resource utilization interval.

23. The UE of claim 11, wherein the information is acquired by receiving the information from a network node and/or another UE.

24. The UE of claim 11, wherein the allowed time interval of the pool is acquired based on detecting periodicity of transmissions by at least one other UE, or periodicity of booking messages received from the at least one other UE.

25. The UE of claim 15, wherein each of the pools defines time and/or frequency resources allowed to be selected for future transmission by the UE and which at least partially overlap or do not overlap with the time and/or frequency resources of the other pools.

* * * * *